Nov. 18, 1924.
J. W. BRYCE
1,515,995
ELECTRIC MULTIPLYING MACHINE
Filed Dec. 30, 1920
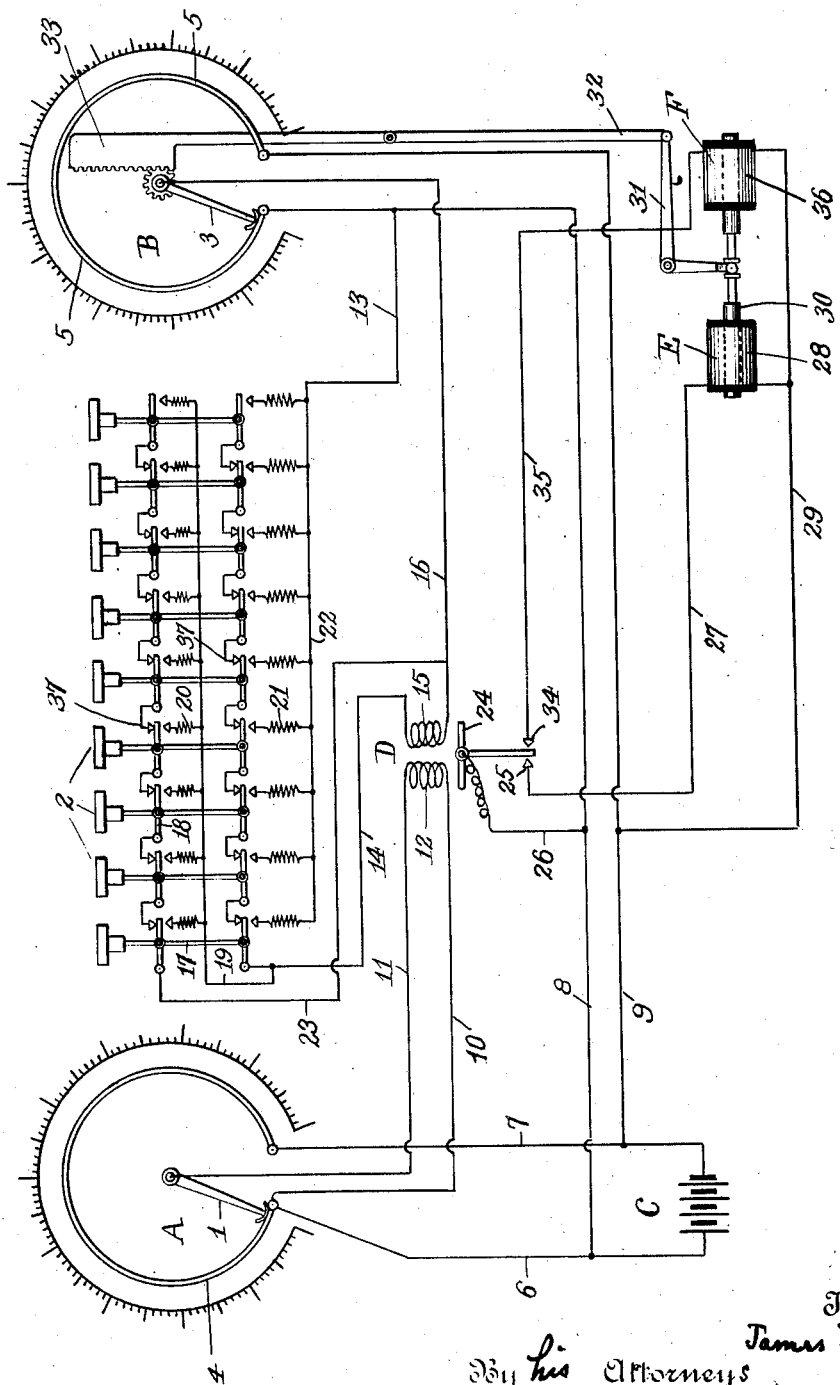
Inventor
James W. Bryce
By his Attorneys
Kerr, Page, Cooper & Hayward Patented Nov. 18, 1924.

1,515,995

UNITED STATES PATENT OFFICE.

JAMES W. BRYCE, OF BINGHAMTON, NEW YORK, ASSIGNOR TO THE INTERNATIONAL TIME RECORDING COMPANY OF NEW YORK, A CORPORATION OF NEW YORK.

ELECTRIC MULTIPLYING MACHINE.

Application filed December 30, 1920. Serial No. 433,975.

*To all whom it may concern:*

Be it known that I, JAMES W. BRYCE, a citizen of the United States, residing at Binghamton, in the county of Broome and State of New York, have invented certain new and useful Improvements in Electric Multiplying Machines, of which the following is a full, clear, and exact description.

The invention which forms the subject of the present application for Letters Patent is an improvement in what may be designated as an electric ratio price mechanism. This title, however, is specific to one of the objects or functions of the invention which, generally stated, is to produce a device by means of which the product of two numbers may be expressed on a dial or any other suitable form of indicator. In considering the nature of the invention and construing the claims which follow this specification this fact should be borne in mind,—that the improvement is generic, at least in purpose, and capable of a wide application.

The invention requires but little and but simple mechanism for carrying it out, so far as its broad principles are concerned, and it is my purpose herein to show and describe only such means as are typical of those needed for this purpose. With this object in view I have attached a single diagram illustrating such devices and circuits as are necessary and to this drawing reference is now made for an explanation of the nature and purpose of the improvement.

Let A designate such a device as a dial which, for example, may be that of a weighing scale or similar device, and upon which the weight of any article in pounds and fractions of a pound will be indicated by the position of a pointer 1. B represents another dial which may be designed and arranged to show the product, say in dollars and cents, of the weight as indicated on dial A, and any one of an arbitrary number of digits, say nine, corresponding to a series of keys 2. As indicated above, the pointer 1 may be moved by a spring, a beam, by hand or otherwise, but in the operation of the device the depression of any one key 2 will cause the pointer 3 on the dial B to assume automatically a position which will indicate on the scale thereon, the product of the figure indicated on dial A and the digit corresponding to the key depressed. It will be observed that the depression of one of the keys 2 is necessary before the dial B will give a reading corresponding to that of dial A. In each dial or in any proper manner associated therewith is a slide wire or circular resistance 4 and 5 over which contacts carried by the pointers 1 and 3 move as the pointers turn about their axes. C is a battery or other source of current having its poles connected by wires 6 and 7 to the ends of the slide wire 4 of dial A and by wires 8 and 9 to the ends of slide wire 5 of dial B. The two slide wire resistances are hence in parallel or multiple connection with the battery, and current from the latter therefore divides and flows through the two said wires.

The resistance of the slide wire 4 is such as to permit a certain known current to flow and hence there is a drop of potential along the wire of practically all of that supplied by the battery C.

D is a differentially wound polarized relay and potentiometer connections to it are provided in a wire 10 tapped onto wire 6 at its point of connection with the slide wire 4, and a wire 11 connected to the movable pointer arm 1. It is manifest, therefore, that as long as the pointer remains in the zero position indicated by the drawing, there will be no difference of potential across the coil 12 of the polarized relay D. This difference, however, will increase in proportion to the sliding movement clock-wise of the pointer over the slide wire 4, until it reaches the other end of such wire when the full potential of the battery will be across the relay coil.

The same conditions obtain with respect to the slide wire 5, the ends of which are connected to the battery by the wires 8 and 9. A wire 13 connects the wire 8 through the key contacts to wire 14 which leads to the coil 15 of the polarized relay, the opposite end of such coil being connected through wire 16 to the pivoted arm 3.

The series of keys 2, nine in number, in the present instance operate stems 17 to which are pivotally connected contact arms 18, playing between opposite contact points as shown. A series of resistances 20 of varying character and amount are connected up between the lower contact points of the series of such points for the upper contact arms 18 and a wire 19 connected to wire 14. Similarly a series of variable resistances 21 are arranged between the lower contact stops for the lower arms 18 and a wire 22 connected to wire 13, and these parts are arranged so that the upper contact stops of both series are connected with the arms 18, to the immediate right, by which means all of the upper arms 18 are normally in circuit through wire 23 with wire 16 and the wire 13 is in electrical connection with wire 14. The object of this will be explained, but preliminarily it will be observed that if none of the keys be depressed the wires 13 and 16 will have a potential impressed upon them which may vary from zero to the full potential of the battery.

Let it be assumed that the two coils 12 and 15 of the polarized relay have, normally, equal and opposite effects, and that the two slide wires 4 and 5 are alike and of equal resistance. Under such assumption suppose that the pointer 1 be moved to any given point X on its dial. If then the "one" key be depressed and the pointer 3 be moved to a corresponding position on its dial, each coil 12 and 15 will be influenced by the same current and the relay will not be affected. If the pointer 3 be not so moved, however, a certain potential has been applied to the coil 12, which will give that coil a preponderating influence and move the armature 24 of the relay over onto a contact stop 25. Current will therefore flow from battery C over wire 8 and wire 26 through armature 24, and wire 27 to the coil 28 of a solenoid magnet E, wires 29 and 9, back to the battery.

This solenoid magnet is thereby energized and it will draw in its armature 30 and operate a bell crank lever 31, turning its arms in a clockwise direction and pulling down by a link 32 a rack bar 33 geared through a pinion with the pointer 3. This has the effect of advancing the pointer clockwise over the scale, and over the slide wire 5. This movement, however, gradually increases the potential on coil 15 of the relay D and this increase continues until the magnetism in the two coils approximates and the effect of the two coils is neutralized when armature 24 will move to a central position and break contact with the stop 25 and come to rest. Under all the conditions assumed arms 1 and 3 should then be on corresponding points on their two scales.

To express a different ratio, let it be assumed that one of the keys corresponding to such ratio be depressed. This will throw a shunt resistance 20 directly across the coil 15 and if this resistance be of the proper value with respect to the coil it will reduce the sensitiveness of such coil in that ratio. For example, in the present case it may be assumed to render the coil one-tenth as sensitive as without the resistance.

For convenience in reference the various keys 2 will be referred to as the one-key, two-key, three-key, etc.; the various shunt resistances 20 corresponding to the keys will be referred to as $r^1$, $r^2$, $r^3$, etc.; the various series resistances 21 corresponding to the keys will be referred to as $R^1$, $R^2$, $R^3$, etc.; and the resistance of the coil 15 as K. The resistances 20 and 21 are so designed that the total current in the circuit 13—16 is the same when any key is depressed as when any other key is depressed. This means that the resistance across the wires 13—16 must be a constant or stated in the form of an equation:

$$\text{(A)} \quad \frac{1}{\frac{1}{K}+\frac{1}{r}} + R = \text{constant}.$$

In equation (A) there are but two variables—R and r—and if either of these is known in terms of K, the other may readily be found. The simplest way to design or adjust the system is so that the coil 15 will receive the same current as the coil 12 when the one-key is depressed. This would mean that $r^1$ would be infinite and $R^1$ would be zero in value, the constant in equation (A) would be K, and the coil 15 would receive the full voltage and total current of the line 13—16. Now when any of the resistances r (or 20) is shunted across the coil 15, the part of the total current of the line 13—16 that will flow through the coil 15 is represented by the following ratio:

$$\text{(B)} \quad \frac{r}{r+K}$$

This ratio is known for each of the keys and may be tabulated as follows:

| Key. | Ratio of current in coil 15 to total current in line 13—16. |
|---|---|
| One-key | 1 |
| Two-key | 1/2 |
| Three-key | 1/3 |
| Four-key | 1/4 |
| Five-key | 1/5 |
| Six-key | 1/6 |
| Seven-key | 1/7 |
| Eight-key | 1/8 |
| Nine-key | 1/9 |

From equations (A) and (B) the following table may now be computed; bearing in mind that K is a constant, and the ratios above stated are known:

| Key. | Resistance 20. | Resistance 21. |
|---|---|---|
| One-key | Infinite. | Zero. |
| Two-key | K | K/2 |
| Three-key | K/2 | 2K/3 |
| Four-key | K/3 | 3K/4 |
| Five-key | K/4 | 4K/5 |
| Six-key | K/5 | 5K/6 |
| Seven-key | K/6 | 6K/7 |
| Eight-key | K/7 | 7K/8 |
| Nine-key | K/8 | 8K/9 |

In order to maintain the current in the combination of uniform value the same movement of the key throws into the line through wire 13 a resistance 21 and as throwing in the resistance 20 across the relay coil 15 reduces the resistance of the combination, so the introduction of the proper resistance 21 cuts down the current to the same value which it would have had if no resistance had been shunted across said coil 15.

When the solenoid 15 is the stronger, the armature 24 is attracted towards it and therefore closes contact with a stop 34 which causes current to flow from the battery through wire 8, armature 24, contact 34, and wires 35 and 29 back to the battery. This circuit includes a second solenoid F the coil 36 of which becomes energized and operates to raise the rack bar 33 and turn the pointer 3 anti-clockwise.

The relay D must be polarized. It is manifest that inasmuch as the two windings oppose each other and it is desired to ascertain by the action of the relay which of the coils is the stronger, it will be necessary to polarize the armature so as to cause it to turn to the left when the polarity of the relay is in one direction and to the right when its polarity is reversed.

In the illustration of the device given there are nine keys by which ratios of from one-tenth to nine-tenths may be obtained. This merely requires the resistances 20 and 21 to be adjusted to get any combination that may be desired. In order to prevent interference in case two keys be depressed at the same time, upper contacts 37 are provided for each contact arm 18, so as to cut out all keys to the right of the one desired. Perhaps a better way to express this idea is to say that the key farthest to the left that may be depressed controls the situation.

In the above I have sought to give a mere skeleton outline of the parts necessary for carrying out the invention. In the commercial form of the device other means will be employed so that other fractions of ratios than tenths may be obtained, and numerous other details which are necessary for proper working which need not be specifically set forth herein.

What I now claim as my invention is:

1. In an apparatus of the kind described the combination with such a means as a scale and pointer for indicating values, of a second and similar means, electro-magnetic means for moving the second pointer to give the same indications as the first and resistances of varying value corresponding to given ratios and means for connecting them in circuit with the means for moving the second pointer whereby the latter by its position will indicate the product of the value indicated by the first pointer and the digit corresponding to the resistance thrown in.

2. In an apparatus of the kind described, the combination with a scale and a movable indicator for representing by its position different values, of a second scale and movable indicator therefor, resistances controlled by said movable indicators, a polarized differential relay, the coils of which are in circuits controlled by the movable indicators, electro-magnetic means controlled by the said relay for moving the second indicator to positions corresponding with those assumed by the first, keys corresponding to different digits, resistances controlled thereby of varying values corresponding to such digits, and controlling said electro-magnetic means by the movement of the keys and the introduction into the circuit of the said relay of the corresponding resistance, resulting from such movement, to shift the position of the second indicator to a point which indicates the product of the value indicated by the first indicator and the digit corresponding to the key operated.

3. In an apparatus of the kind described, the combination with two scales, resistance wires associated therewith and indicators constituting terminals and movable over said scales and resistance wires, of a source of current connected with the resistance wires in multiple, a polarized differential relay with coils in paths between one terminal of each resistance wire and its movable indicator, means for moving the second indicator over its scale and resistance wire, an electro-magnetic device controlled by the first coil of the relay for operating the same, whereby the said indicator will be moved to a position corresponding to that occupied by the first indicator, resistances of varying amounts corresponding to different ratios, means for shunting the second coil of the relay by any one of said resistances, and means operated by the said coil of the relay for adjusting the said second indicator to a position on its scale which indicates the product of the value indicated on the first scale and the ratio corresponding to the resistance thrown in.

4. In an apparatus of the kind described, the combination with two scales, resistance wires associated therewith and indicators constituting terminals and movable over said scales and resistance wires, of a source of current connected with the resistance wires in multiple, a polarized differential relay the coils of which are in paths between one terminal of each resistance wire and its movable indicator, means for moving the second indicator over its scale and resistance wire, an electro-magnet device controlled by the first coil of the relay for operating the same, whereby the said indicator will be moved to a position corresponding to that occupied by the first indicator, resistances of varying amounts corresponding to different ratios, means for shunting the second coil of the relay by any one of such resistances, other and corresponding resistances which by the same means are included in the circuit to compensate for the increased amount of flow due to such shunting, and means operated by the shunted coil of the relay for adjusting the said second indicator to a position on its scale where it will indicate a value proportional to the shunting resistance and hence the product of value indicated on the first scale and the ratio corresponding to such resistance.

5. In a device of the kind described the combination with a scale and an indicator movable over the same for indicating different values, of electro-magnetic means for adjusting, according to their magnetic condition, the position of said indicator with respect to such scale, and a plurality of means for varying the said magnetic condition according to different ratios with a given value whereby the indications will be the product of such value and that corresponding to the ratio employed.

6. In an electric multiplying machine, a differentially movable element, a second differentially movable element, a plurality of numeral keys, and electrical means controlled conjointly by the position of the first mentioned movable element and by the particular selection of keys for controlling the position of the second mentioned differential element.

7. In an electrical multiplying machine, a plurality of differentially movable elements, means for automatically displacing one of said elements, a plurality of multiplier designating keys, and means including resistances brought into circuit by the operation of the selected keys for controlling the displacement of the automatically displaced element to designate products thereto.

8. In an electrical multiplying machine, a plurality of differentially movable elements, means for automatically displacing one of said elements, a plurality of multiplier designating keys, and means including resistances brought into circuit by the operation of selected keys and by the position of the differentially movable element which designates the multiplicand for controlling the displacement of the automatically displaced element to designate products thereto.

9. In an electrical multiplying machine, comprising a member which is adapted to be set to designate the multiplicand, product designating means, potentiometer devices associated with said member and said means, means for setting up the multiplier, and means controlled conjointly by said potentiometers and by the setting of the multiplier for displacing said product designating means and for controlling the position of the same to designate the product of the multiplicand and the multiplier.

10. An electrical multiplying machine, comprising a member which is adapted to be set to designate the multiplicand, a potentiometer device controlled thereby, product designating means, setting devices for setting up the amount of the multiplier, and means controlled conjointly by the setting of the aforesaid setting devices, and in accordance with the aforesaid potentiometer setting for controlling the operation of the product designating means.

In testimony whereof I hereto affix my signature.

JAMES W. BRYCE.